(12) United States Patent
Davis

(10) Patent No.: US 6,327,028 B1
(45) Date of Patent: Dec. 4, 2001

(54) NIGHT CONVOY MANEUVER SYSTEM

(75) Inventor: David W. Davis, Little Rock, AR (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/413,581

(22) Filed: Oct. 6, 1999

(51) Int. Cl.[7] .............. G01C 3/08; G01C 3/22; G01C 5/00; B60T 7/16

(52) U.S. Cl. ........... 356/4.03; 180/167; 356/21; 356/22; 356/3.13

(58) Field of Search .................. 356/3.13, 3.1, 356/4.03, 21, 22; 180/167; 33/707

(56) References Cited

U.S. PATENT DOCUMENTS

| | | | |
|---|---|---|---|
| 2,871,754 | * | 2/1959 | Marble . |
| 3,693,143 | * | 9/1972 | Kennedy . |
| 3,721,499 | * | 3/1973 | Narbaits-Jaureguy . |
| 3,892,483 | * | 7/1975 | Saufferer . |
| 4,195,425 | * | 4/1980 | Leitz et al. . |
| 4,257,703 | * | 3/1981 | Goodrich . |
| 5,249,128 | * | 9/1993 | Markandey et al. . |
| 5,644,442 | * | 7/1997 | Lemere ........................ 356/21 |

* cited by examiner

Primary Examiner—Stephen C. Buczinski
(74) Attorney, Agent, or Firm—Marsteller & Associates, P.C.

(57) ABSTRACT

A distance judging system (S) includes at least two spaced apart marker devices (10) formed on a first object (12) and providing a signal (14). A viewer (A) is adapted to detect relative position of the signals (14) from the markers (10), and create an image (22) of the relative positions of the markers (10) within a field of view (16). A reticle (18) is superimposed on the field of view (16) of the viewer (A). The reticle (18) is selected to form a control area (20) within which simultaneous appearance of at least two images (22) of the markers (10) indicates that the first object (12) is at a distance (24) at least as great as a desired distance from the viewing apparatus (A); whereas, simultaneous appearance of less than two images (22) of the markers (10) within the control area (20) indicates that the first object (12) is at a distance (24) less than the desired distance.

25 Claims, 3 Drawing Sheets

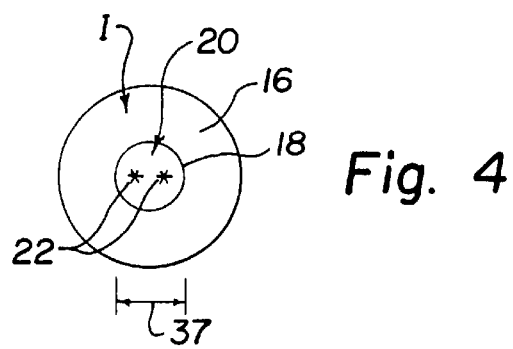
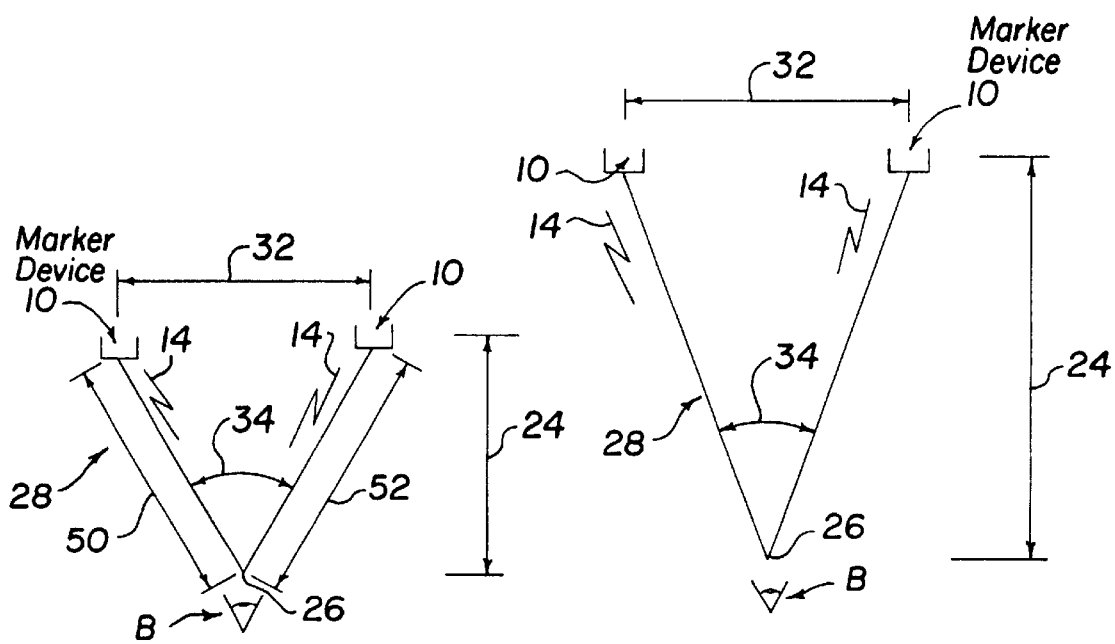
Fig. 5a
Fig. 5b
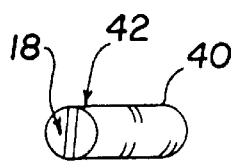
Fig. 6a
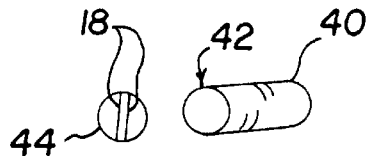
Fig. 6b

NIGHT CONVOY MANEUVER SYSTEM

BACKGROUND OF THE INVENTION

1. Technical Field.

The invention relates to the field of night vision devices that enable a viewer to observe objects at night or during other low-light conditions. More particularly, this present invention relates to a system for gauging distances between objects under low light conditions.

2. Background Art.

Night vision devices (NVD) are well known. A common type of a night vision device is based on an image intensification technology and is used to provide soldiers, aviators, and sailors with the ability to view objects at night or during other low light conditions.

A common scenario associated with the use of a night vision device is a soldier using a night viewer, such as a night vision goggle ("NVG") AN/PVS-7 or others, to observe a battlefield scene at night. If the night-time battlefield scene includes people sitting in a vehicle, it is likely that at some point the vehicle occupants will need light to illuminate their compartment to complete operations. Unless otherwise protected, the light source will cast a glow that is visible to the observer outside the vehicle. To prevent or minimize observation by an "unfriendly" soldier using a NVG, a "blackout mode of operation" has been adopted to counteract the observation advantages that the "unfriendly" NVG equipped soldier may have on the battlefield. Consequently, this scenario has prompted a concern with the tactical risk associated with any lighting used in the night vision goggle ("NVG") blackout mode of operation.

The military has recognized a problem with night vision imaging devices typified in the PVS-7 NVIS (Night Vision Imaging Systems), substantially manifested by vehicle impacts between a leading and trailing vehicle in a convoy. This is commonly called a "Rear-End Collision" and frequently results in a series of collisions between multiple vehicles in a convoy.

It is recognized that NVIS devices suffer from an inherent deficiency with human depth perception by the users of devices like the PVS-7 and similar. The depth perception problem has been recognized and historically has been addressed by reducing convoy speeds and increasing required spacing between vehicles. Military wide orders have been directed to NVIS convoy operators to maintain a low speed. Vehicle spacing varies depending upon logistic or command procedures of each Battalion or group.

A low speed limit for night convoy operations increases susceptibility to enemy detection and increases exposure time to enemy threats. Any effective increase in speed would reduce the convoy's exposure time, and reduce the probability of detection by the enemy at any point outside of the hearing range of the convoy.

Statements have been issued having an objective to increase the pace of battlefield operations beyond the enemy's ability to react, along with a requirement to maintain operations in the nighttime battlefield.

To accomplish these objectives, a completely new method has had to be developed to accomplish enhanced convoy operations, while maintaining safe convoy and troop movements during the night.

A number of alternative methods can be examined, including acoustic sonic measuring techniques, where an acoustic pulse is emitted and the time measured for an echo to return to the device. This time delay can be used to accurately determine the distance between vehicles or objects. The primary problem with this strategy is it generates a signal which can be detected by the enemy, thus increasing the susceptibility for the convoy to be targeted and destroyed.

Similar strategies could be developed using lasers or other wavelengths of generated signals and in each case creating a detection risk to the convoy from the enemy.

For aviation purposes landing systems using combinations of lights have been used to indicate proper glide slopes to pilots during final approaches to landing. A combination of lights or lenses have been used to project a different indication of lights to the approaching pilot depending on the pilot's relative position to the standard glide slope when viewing the indicator device.

Also, observers for artillery have used binocular type devices having indicators to help the observer determine relative distances for targets.

While the above cited references introduce and disclose a number of noteworthy advances and technological improvements within the art, none completely fulfills the specific objectives achieved by this invention.

DISCLOSURE OF INVENTION

In accordance with the present invention, a distance judging system includes at least two spaced apart marker devices formed on a first object and providing a signal. A viewing apparatus is adapted to detect relative position of the signals from the markers, and create an image of the relative positions of the markers within a field of view. A reticle is superimposed on the field of view of the viewing apparatus. The reticle is selected to form a control area within which simultaneous appearance of at least two images of the spaced apart markers indicates that the first object is at a distance at least as great as a desired distance from the viewing apparatus; whereas, simultaneous appearance of less than two images of the markers within the control area indicates that the first object is at a distance less than the desired distance from the viewing apparatus.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

FIG. 4 is an alternative reticle.

FIGS. 5a and 5b depict the geometric relationships involved in the present invention.

FIGS. 6a and 6b show two alternative embodiments of the present invention with a type of a detector, such as an image intensifier tube.

MODE(S) FOR CARRYING OUT THE INVENTION

Figure 1:
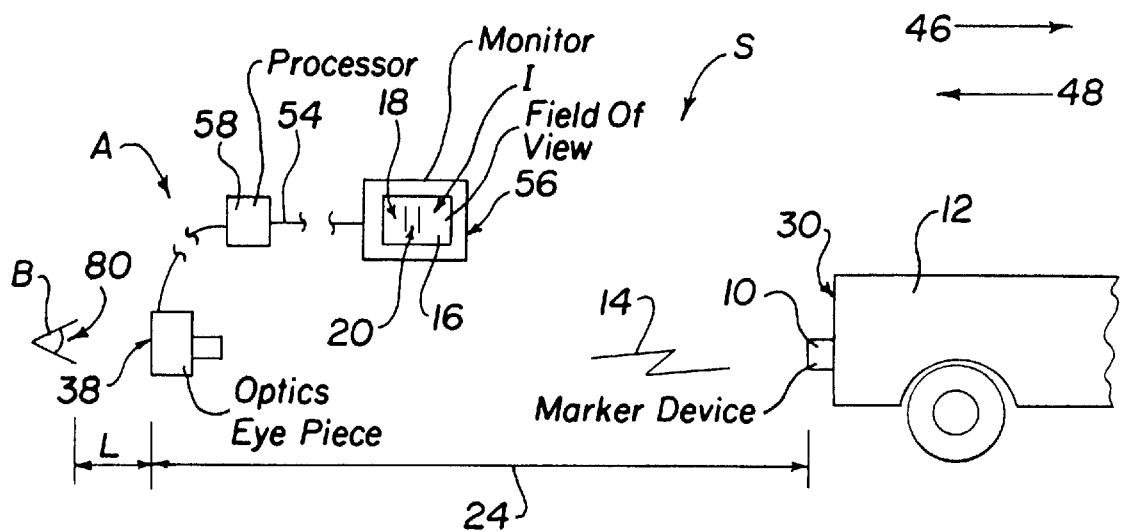
FIG. 1 is a schematic representation of use of the present invention in a convoy maneuver situation.

So that the manner in which the above recited features, advantages and objects of the present invention are attained can be understood in detail, more particular description of the invention, briefly summarized above, may be had by reference to the embodiment thereof that is illustrated in the appended drawings. In all the drawings, identical numbers represent the same elements.

A distance judging system S includes at least two spaced apart marker devices 10 formed on a first object 12 and providing a signal 14. A viewing apparatus A is adapted to detect relative position of the signals 14 from the markers 10, and create an image I showing the relative positions of the markers within a field of view 16. A reticle 18 is superimposed on the field of view 16 of the viewing apparatus A. The reticle 18 is selected to form a control area 20 within which simultaneous appearance of at least two marker images 22 of the spaced apart markers 10 indicates that the first object 12 is at a distance 24 at least as great as a desired distance from the viewing apparatus A; whereas, simultaneous appearance of less than two images 22 of the markers 10 within the control area 20 indicates that the first object 12 is at a distance 24 less than the desired distance from the viewing apparatus A.

The present invention is a passive method requiring no generated signals 14 that can be detected by the enemy. Markers 10, either as passive reflectors or as active light sources with limited field of view, allow the operator B to accurately determine the spacing 24 between vehicles during convoy operations.

In such a situation in which one or more of the marker devices 10 on the back 30 of a vehicle 12 are active sources, then it is preferred that the marker devices 10 should be obscured to an observer who is located in a direction relative to the first object 12 that is not essentially opposite 48 to an intended line of travel 46 for the first object 12.

For an active source marker device 10, the output signal 14 from the marker device 10 must be compatible with the viewing apparatus A, whether the viewer A is an image intensifier, infrared, or other type of viewer. The signal 14 from at least one of the marker devices 10 can be encoded with an Identification Friend or Foe (IFF) type information, and the viewing apparatus A would be modified to decode such an IFF signal. This would provide enhanced protection to the observers B.

The operator's B retina 80 of the viewing apparatus A, and particularly a viewer that is a NVD, forms the vertex 26 of an Isosceles Triangle 28 with two marks on a leading vehicle's 12 rear bumper or tailgate 30. The distance between the vertex 26 and each of the two spaced apart marker devices 10 is the same, that is length 50 equal length 42 in FIG. 5a. If one establishes a specified distance 32 between two light sources 10 on the rear 30 of a leading vehicle 12 to be 6 feet, then a requirement of a specified length to be 60 feet can be established. The required angle 34 can be calculated to be 5.739 degrees. This allows a definition for the location of the marks in the field of view 16 of the NVIS. These marks commonly are defined as reticles 18 inside an optical system. In a preferred embodiment the reference marks are two spaced apart vertical lines that represents an angle between the vertex 26 of the operator's B retina, and the two light or reflective markers 10 on the rear 30 of the leading vehicle or reference object 12.

The angle 34 is calculated by the marker spacing 32 and required distance with the formula $A=ARCSIN(SIN(A))$, where we calculated $SIN(A)$ from the length of the two known distances, $SIN(A)=L2/L2$. Where L1 and L2 represent the lengths of the vehicle spacing 24 and marker spacing 32 respectively.

FIGS. 5a and 5b demonstrate that given a fixed distance 32 between a pair of markers 10, the angle 34 at the vertex 26 increases with the shortening of the distance 24.

It is preferred that the spaced apart marker devices 10 are formed on the first object 12 in a manner suitable to being equidistant from the viewing apparatus A when the first object 12 and the viewing apparatus A are aligned for judging or determining distance 24.

The reticle spacing 36 can be calculated by estimating the distance from the operator B's retina 80 to the rear of the NVIS optics eye piece 38 using the formula $L3=L*SIN(A)$, where L3 is the reticle spacing 36 and L is the estimated distance of the NVIS eyepiece to the operator's retina and $SIN(A)$ is from the angle 34 established earlier.

This formula can be used due to the fact, as in the case of the PVS-7 and similar devices, the image is presented to the operator B on approximately a 1 to 1 scale. The optics will change the image scale at certain locations in the optic path to achieve approximately the 1 to 1 scale view for the user. In this case the distance from the eyepiece to the retina is an effective distance for the calculation. However, the reticle 18 is formed on or on an adapter disk or ring 44 adjacent to an image intensifier type tube's 40 output screen or face 42 in the optic path using the referenced spacing calculated from the eyepiece to the retina, which is different from the actual distance of the tube face 42 to the retina. See FIGS. 6a and 6b.

Referring to FIGS. 6a and 6b, the reticle 18 can be formed on a glass or plastic disk with any of number of known methods such as metallic deposition and photolithography, acid etch and fill using a photo-resist, or using a diamond scribe. If a ring is used, reticle wires or even portions of a spider's web can be used to create the reticles. As long as the adapter disk 44 is located approximately near the focal plane where the eyepiece of the viewing apparatus A focuses on the output screen 42.

Figure 2:
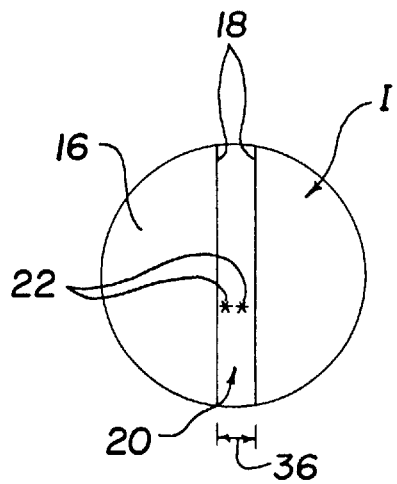
FIG. 2 is an exemplary appearance of the reticles of the present invention with markers showing a safe distance between the object and the viewer.
Figure 3:
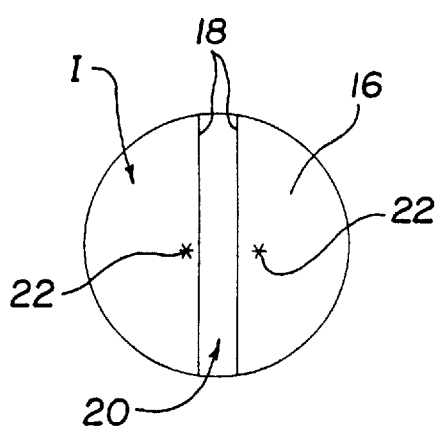
FIG. 3 is an exemplary appearance of the reticles of the present invention with markers showing a distance between the object and the viewer being less than desired.

In FIG. 2, the vehicle marker images 22 are shown in the case where the vehicle spacing is adequate or greater than the minimum. FIG. 3, shows the situation where the NVIS driver is following the forward vehicle 12 too close. The observer B should slow down until the marker images 22 appear inside of the two vertical lines 18.

Method of Operation

The desired distance between a viewing apparatus A can be maintained relative to a first object 12 by taking the steps of forming with the viewing apparatus A an image within a field of view 16 of the relative positions of signals 14 from at least two spaced apart marker devices 10. The marker devices 10 are formed on the first object 12. The viewing apparatus A has a reticle 18 forming a control area 20 and the reticle 18 is suitable to be superimposed on the field of view 16.

The distance is determined between the viewing apparatus A relative to the first object 12 whereby the simultaneous appearance of at least two images 22 of the spaced apart markers 10 indicates that the first object 12 is at a distance 24 at least as great as a desired distance from the viewing apparatus A; and, simultaneous appearance of less than two images 22 of the spaced apart markers 10 within the control area 20 indicates that the first object 12 is at a distance 24 less than the desired distance from the viewing apparatus A. The relative distance between the viewing apparatus A and first object 12 can be adjusted or correct ed to achieve the desired distance.

Alternative Embodiments

The alternative embodiments of the present invention are numerous and depend on the type of vision enhancing system being utilized, such as thermal or IR (infrared) viewing systems, or a system that fuses images from several types of viewing systems onto a monitor or computer screen. Yet another alternative embodiment of the viewing apparatus A could be a Driver's Viewer 62, or periscope type, that may be found in an armored vehicle 64.

FIG. 1 shows a viewing apparatus A having an output communicating through connection 54 with an output monitor device 56, such as a LCD or CRT screen. The reticle 18 is superimposed on the image I by means of an intermediate processor 58, such as a micro-processor. The reticle 18 in such a situation can be adjusted as desired to account for different types of viewing apparatus A, distances 32 between the markers 10, or desired distance 24. For example, the reticle spacing 36 or distance between two parallel lines could be increased or decreased, or the diameter of a circular reticle could be made larger or smaller. See FIG. 4.

The reticle 18 of the present invention can include two parallel lines or another format, such as a square or rectangle, or a circle or oval (see FIG. 4).

Figure 7:
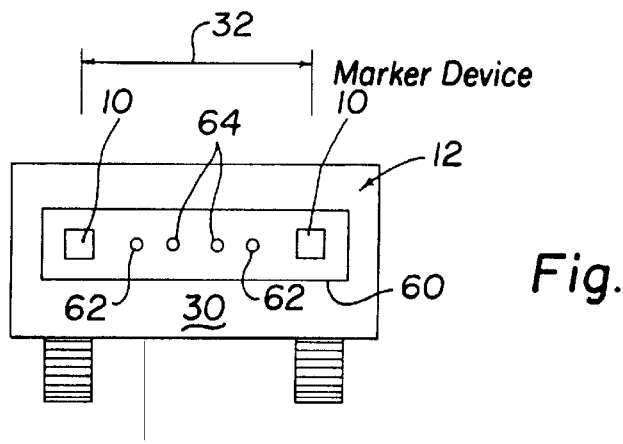
FIG. 7 is a rear exterior view of a typical vehicle having the markers of the present invention mounted on an adjustable frame.

FIG. 7 shows an alternative method of mounting a pair of marker devices 10. The markers 10 are fixed to a mount 60 attached or formed on the first object 12. Pairs of positions 62 and 64 are alternative mounting points for the pair of markers 10 to adjust the distance between the markers 10. For situations in which the following vehicle, or the following viewing device has a fixed distance 32 in the reticle 18, the desired spacing to between the first object 12 and viewing apparatus A can be adjusted by increasing or decreasing the distance 32 between the markers.

Figure 8:
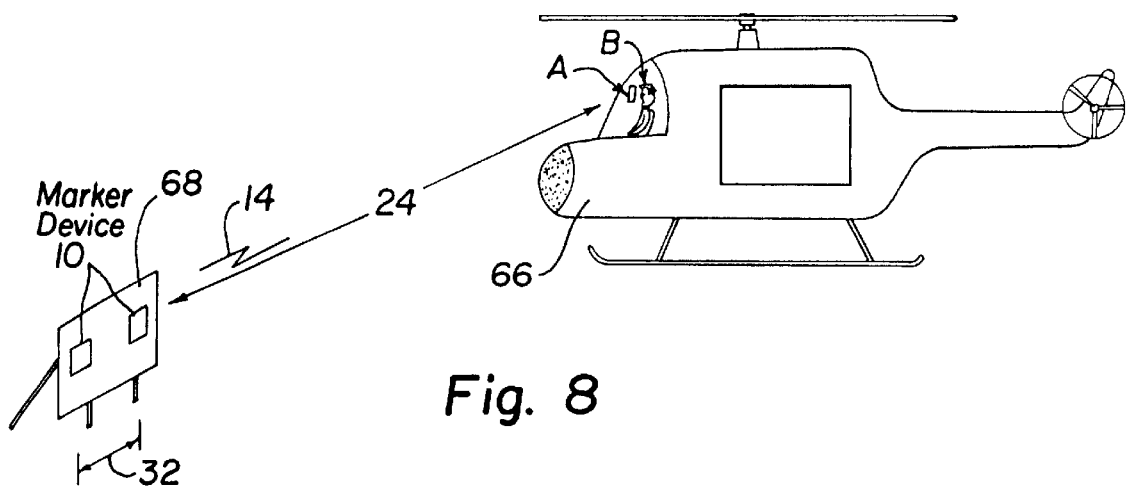
FIG. 8 is another schematic diagram of the present invention being used in an aviation scenario.
Figure 9:
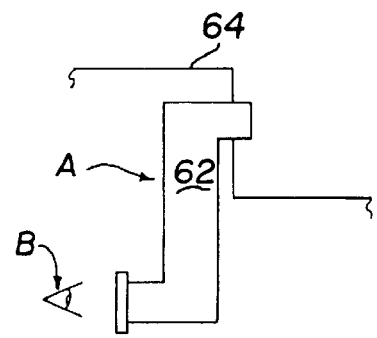
FIG. 9 depicts a known Driver's Viewer such as that used in an armored vehicle.

Finally, FIG. 8 schematically depicts use of the present invention in an aviation scenario. A helicopter 66, for example, has a pilot or operator B using a NVD A to judge distance from a landing zone marked with at least two marker devices 10 attached to a fixed display or mount 68. The use of the present invention would permit the pilot to determine relative distance to the landing zone. Equally possible is the use of a fixed display being used in the helicopter, such as a forward looking infrared (FLIR) device adapted to have a reticle image; so long as the display markers 10 are compatible with the type of viewing apparatus A being utilized.

The foregoing disclosure and description of the invention are illustrative and explanatory thereof, and various changes in the size, shape and materials, as well as in the details of the illustrated construction may be made without departing from the spirit of the invention.

What is claimed is:

1. A night distance judging system for use by an observer viewing a scene comprising:

at least two spaced apart marker devices formed on a first object, each marker device providing a signal compatible with a night vision device;

a night vision device (NVD) viewing apparatus adapted to detect relative positions of the signals from the markers, and create an image of the relative positions of the markers within a field of view;

a reticle formed with the NVD having a reticle spacing between lines suitable to be superimposed on the field of view of the viewing apparatus; and, the reticle spacing being selected to form a control area within which simultaneous appearance of at least two images of the spaced apart markers indicates that the first object is at a distance at least as great as a desired distance from the viewing apparatus; and, simultaneous appearance of less than two images of the spaced apart markers within the control area indicates that the first object is at a distance less than the desired distance from the viewing apparatus; said reticle spacing being calculated by the formula L*SIN(A) where L is a distance between an eyepiece of the NVD to a retina of the operator and SIN(A) equals the result of a distance from the NVD to a plane formed by the spaced apart market devices divided into a distance between at least two of the spaced apart markers; and the observer during use of the night distance judging system forms a vertex of an isosceles triangle composed of the observer and two of the spaced apart marker devices with the NVD having the reticle being located between the observer and the marker devices.

2. The invention of claim 1 wherein the NVD includes an image intensifier tube having the reticle formed with an output screen.

3. The invention of claim 1 wherein the NVD includes an image intensifier tube with an output screen and an adapter for mounting adjacent the output screen, and the adapter formed having a desired reticle.

4. The invention of claim 1 wherein the signal from the spaced apart marker devices is obscured to an observer who is located in a direction relative to the first object that is not essentially opposite to an intended line of travel for the first object.

5. The invention of claim 1 wherein the spaced apart markers are formed on the first object in a manner suitable to being equidistant from the viewing apparatus when the first object and the viewing apparatus are aligned for judging distance.

6. The invention of claim 1 wherein the reticle is adjustable.

7. The invention of claim 1 wherein the spaced apart marker devices have an adjustable distance therebetween.

8. The invention of claim 1 wherein at least one of the marker devices actively generate a signal.

9. The invention of claim 8 wherein the signal of the marker device is encoded with Identification Friend or Foe (IFF) type information, and the viewing apparatus is adapted to decode the IFF signal.

10. A night viewing apparatus for judging distance by an observer viewing a scene comprising:

the viewing apparatus is a night vision device (NVD) being adapted to detect relative positions of signals from at least two spaced apart marker devices formed on a first object, each marker device providing a signal compatible with the NVD, and the viewing apparatus being further adapted to create an image of the relative positions of the markers within a field of view;

a reticle formed with the NVD having a reticle spacing between lines suitable to be superimposed on the field of view of the viewing apparatus; and, the reticle spacing being selected to form a control area within which simultaneous appearance of at least two images of the spaced apart markers indicates that the first object is at a distance at least as great as a desired distance from the viewing apparatus; and, simultaneous appearance of less than two images of the spaced apart markers within the control area indicates that the first object is at a distance less than the desired distance from the viewing apparatus; said reticle spacing being calculated by the formula L*SIN(A) where L is a distance between an eyepiece of the NVD to a retina of the operator and SIN(A) equals the result of a distance from the NVD to a plane formed by the spaced apart market devices divided into a distance between at least two of the spaced apart markers; and the observer during use of the night distance judging system forms a vertex of an isosceles triangle composed of the observer and two of the spaced apart marker devices with the NVD having the reticle being located between the observer and the marker devices.

11. The invention of claim 10 wherein the NVD includes an image intensifier tube having the reticle formed with an output screen.

12. The invention of claim 10 wherein the NVD includes an image intensifier tube with an output screen and an adapter for mounting adjacent the output screen, and the adapter formed having a desired reticle.

13. The invention of claim 10 wherein the signal from the spaced apart marker devices is obscured to an observer who is located in a direction relative to the first object that is not essentially opposite to an intended line of travel for the first object.

14. The invention of claim 10 wherein the spaced apart markers are formed on the first object in a manner suitable to being equidistant from the viewing apparatus when the first object and the viewing apparatus are aligned for judging distance.

15. The invention of claim 10 wherein the reticle is adjustable.

16. The invention of claim 10 wherein at least one of the marker devices actively generate a signal.

17. The invention of claim 16 wherein the signal of the marker device is encoded with Identification Friend or Foe (IFF) type information, and the viewing apparatus is adapted to decode the IFF signal.

18. A method of maintaining a desired distance between an observer viewing a scene during night using viewing apparatus relative to a first object including the steps of:

forming with a night vision device (NVD) viewing apparatus an image of relative positions of signals compatible with the NVD from at least two spaced apart marker devices formed on the first object within a field of view; the viewing apparatus being located between the observer and the marker devices and having a reticle forming a control area and suitable to be superimposed on the field of view; the observer when using the NVD having the reticle forms a vertex of an isosceles triangle composed of the observer and two of the spaced apart marker devices with the NVD located between the observer and the marker devices; said reticle spacing being calculated by the formula L*SIN(A) where L is a distance between an eyepiece of the NVD to a retina of the operator and SIN(A) equals the result of a distance from the NVD to a plane formed by the spaced apart market devices divided into a distance between at least two of the spaced apart markers;

determining whether the distance between the viewing apparatus relative to the first object is at least as large as a selected distance whereby the simultaneous appearance of at least two images of the spaced apart markers indicates that the first object is at a distance at least as great as a desired distance from the viewing apparatus; and, simultaneous appearance of less than two images of the spaced apart markers within the control area indicates that the first object is at a distance less than the desired distance from the viewing apparatus; and, correcting the relative distance between the viewing apparatus and first object to achieve a desired distance.

19. The method of claim 18 wherein the NVD includes an image intensifier tube having the reticle formed with an output screen.

20. The method of claim 18 wherein the NVD includes an image intensifier tube with an output screen and an adapter for mounting adjacent the output screen, and the adapter formed having a desired reticle.

21. The method of claim 18 wherein the signal from the spaced apart marker devices is obscured to an observer who is located in a direction relative to the first object that is not essentially opposite to an intended line of travel for the first object.

22. The method of claim 18 wherein the spaced apart markers are formed on the first object in a manner suitable to being equidistant from the viewing apparatus when the first object and the viewing apparatus are aligned for judging distance.

23. The method of claim 18 wherein the reticle is adjustable.

24. The method of claim 18 wherein at least one of the marker devices actively generate a signal.

25. The method of claim 24 wherein the signal of the marker device is encoded with Identification Friend or Foe (IFF) type information, and the viewing apparatus is adapted to decode the IFF signal.

* * * * *